Jan. 17, 1956  F. H. MUELLER ET AL  2,731,207
RELIEF VALVE

Filed Sept. 26, 1951  2 Sheets-Sheet 1

INVENTORS:
Frank H. Mueller,
and Earl E. Tinker,
BY Cushman, Darby & Cushman
ATTORNEYS.

Jan. 17, 1956    F. H. MUELLER ET AL    2,731,207
RELIEF VALVE
Filed Sept. 26, 1951    2 Sheets-Sheet 2
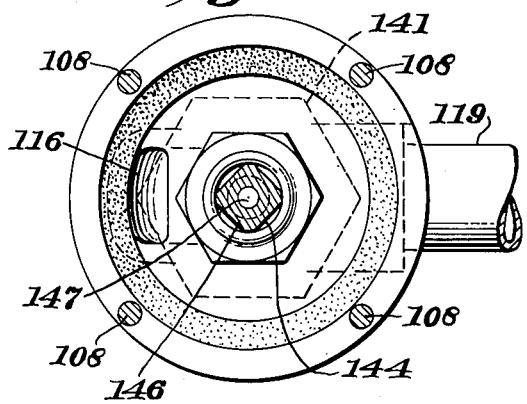
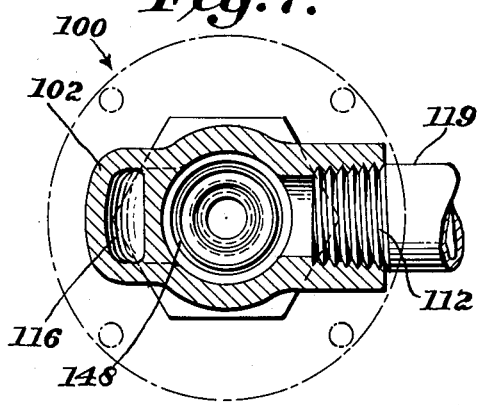
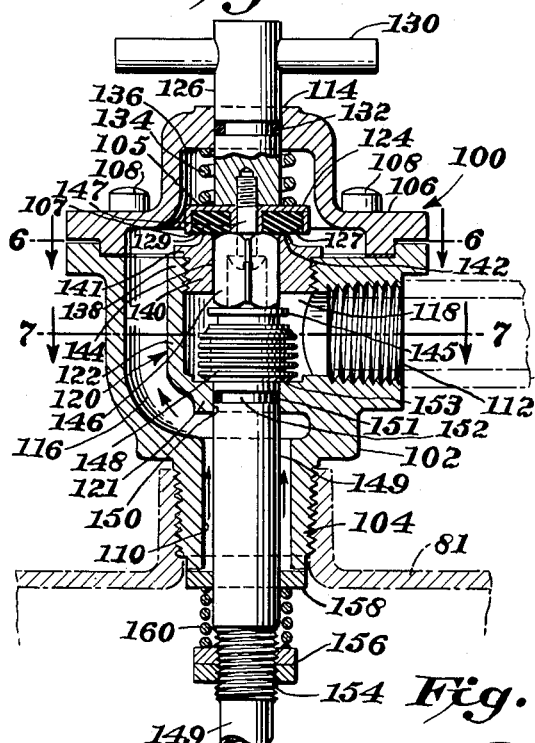
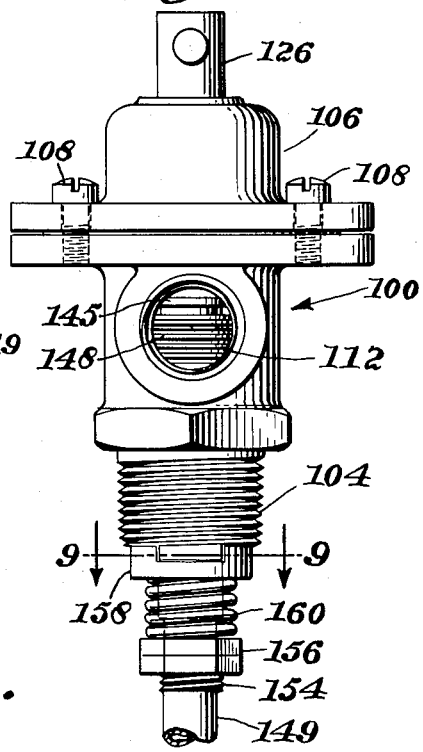
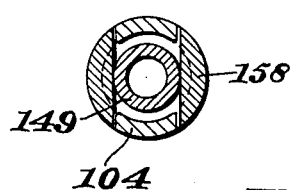
INVENTORS:
Frank H. Mueller,
Earl E. Tinker,
BY Cushman, Darby & Cushman
ATTORNEYS.

United States Patent Office 2,731,207
Patented Jan. 17, 1956

2,731,207

RELIEF VALVE

Frank H. Mueller and Earl E. Tinker, Decatur, Ill., assignors to Mueller Co., Decatur, Ill., a corporation of Illinois Application September 26, 1951, Serial No. 248,328

8 Claims. (Cl. 236—92)

The present invention relates to a new and improved relief valve for fluid supplying heating systems and the like. More particularly, the present invention relates to a relief valve of the type known as "automatic" or "reseating."

In prior art valves of this type it has been found that the commonly used beaded valve seat, when associated with a composition member or washer on the valve, is the most positive and efficient of any known type of seat, and requires less pressure to maintain it closed as long as it is kept free and clean of foreign matter. The ability of this type valve to keep itself free from foreign matter is greatly reduced if the seat becomes embedded into the washer as the valve is moved to its closed position. Very little embedding will take place if the closing force or pressure is equal to or slightly in excess of the force required to effect a pressure seal.

In a valve providing temperature relief, embedding of the seat is doubly objectionable. It not only increases the tendency to trap foreign matter on the seating surface, but also permits the valve seat to change its position and hence modify the temperature at which the valve is set to relieve. Furthermore, the elevated temperatures to which such a valve must necessarily be subjected increase the tendency to embed in the valve washer. In extreme cases, embedding of the valve even prevents the valve from being properly seated.

A relief valve which closes with the pressure must have a spring load sufficient to effect closure when some minimum pressure is helping it. Although this is advantageous prior to installation, service conditions might require the valve to operate at pressures four or five times the minimum, and these pressures would produce an excessive closing force and excessive embedding of the seat in the valve washer.

Accordingly, therefore, an important object of the present invention is to provide a relief valve having a contacting surface of suitable durable composition material and which is arranged to be moved into contact with a beaded valve seat so as to provide an effective seal but without danger of being severely embedded into the seat.

A further important object of the present invention is to provide a temperature and pressure relief valve wherein increasing system pressures do not cause the valve to engage with increasing force against its seat.

A still further important object is to provide a quick opening temperature and pressure relief valve of the automatic or re-seating type which is more positive and accurate in operation than valves heretofore available, and which permits complete replacement of all the working parts through the top of the valve body without removing the valve from the tank, boiler or other fluid heating system with which it is associated.

A still further object is to provide a valve wherein the thermal element is prevented from making substantial movement downwardly into the tank, boiler or other fluid heating system with which it is associated, and wherein the entire thermal responsive element is capable of axial bodily movement upwardly to unseat the valve when the pressure in the inlet chamber reaches a predetermined point.

Other objects and advantages of the invention will become apparent from the following description when taken in conjunction with the accompanying claims and drawings.

Referring to the drawings in which are shown several preferred embodiments of the invention:

Figure 5 is a sectional view of a modified form of the invention.

Figure 6 is a plan view taken substantially along the line 2—2 of Figure 5.

Figure 7 is a sectional view taken along the line 7—7 of Figure 5.

Figure 8 is an end view of Figure 6.

Figure 9 is a view taken substantially along the line 9—9 of Figure 8.

Figure 2:
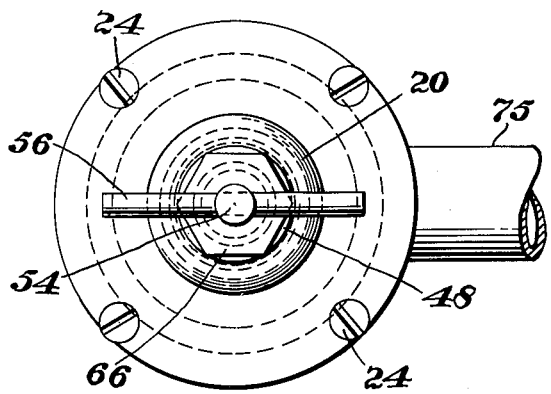
Figure 2 is a plan view of the valve shown in Figure 1.
Figure 3:
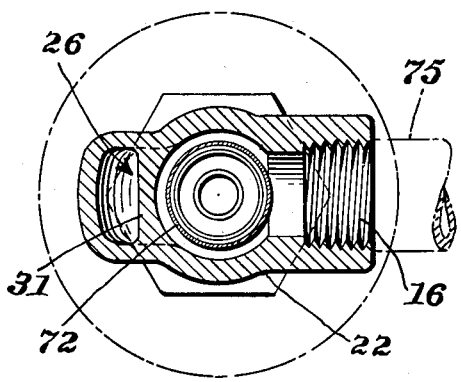
Figure 3 is a horizontal sectional view taken substantially along the line 3—3 of Figure 1.
Figure 1:
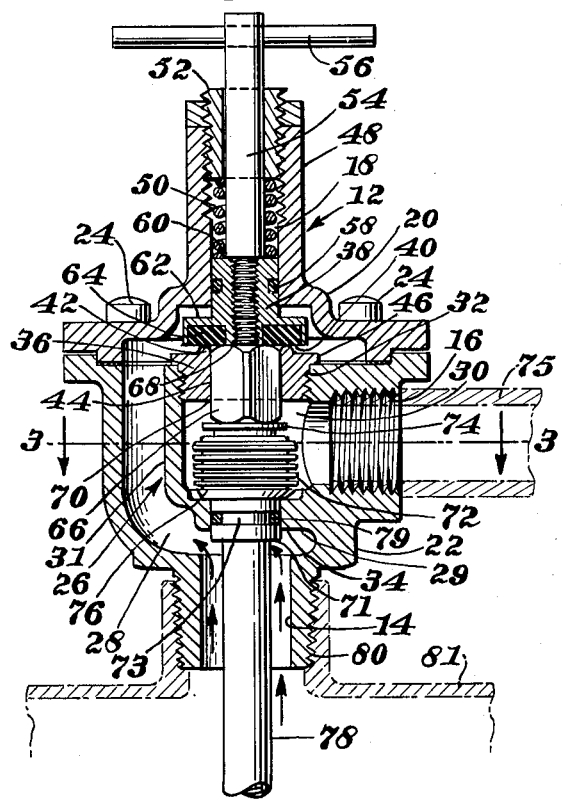
Figure 1 is a vertical sectional view of a relief valve constructed in accordance with the present invention.
Figure 4:
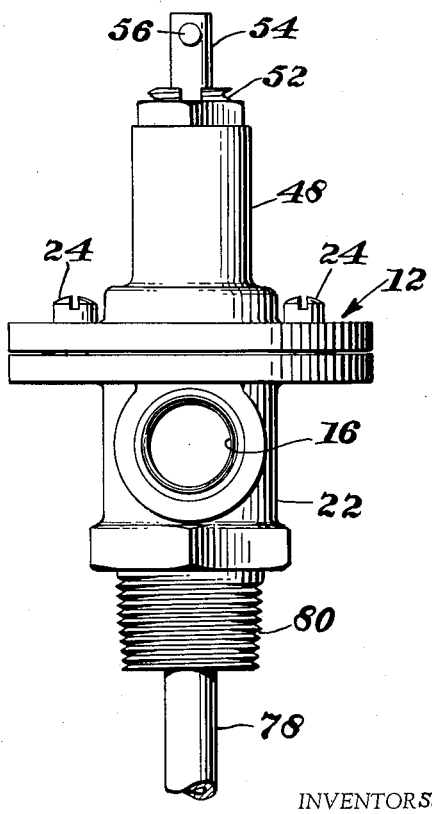
Figure 4 is an end view of Figure 1.

Referring to the drawings, 12 indicates a valve housing or body of any suitable size and shape and which has the inlet opening 14 and outlet opening 16. The valve casing 12 is composed of the two sections 20 and 22, upper cap section 20 being secured to lower section 22 by means of suitable bolts 24, as seen in Figure 1. Upper section 20 is provided with the open neck portion 18 for purposes to be subsequently explained.

By means of the inner partition 26 valve housing 12 has its interior portion divided into the inlet chamber 28 and outlet chamber 30. Inner partition member 26 is comprised of the lower horizontal section 29 and vertical section 31. Upper opening 32 and a lower aligned opening 34 communicate the inlet with the outlet chamber. The upper opening 32 provided between the free end of the vertical portion 31 of the partition 26 and valve housing 12 is screw threaded in order to receive the beaded valve seat ring 36.

Axially slidable valve member 38, having a composition washer 40 recessed in its undersurface, seats against the upwardly extending beaded portion 42 of the valve seat ring 36. The valve seat member or ring 36 has a central opening 44 establishing communication between the inlet chamber 28 and the outlet chamber 30. Valve seat ring 36 is also formed with an annular outwardly extending radial flange 46, which constitutes a stop or bottom for limiting the inward movement of the valve seat ring 36 when threaded into the upper partition opening 32.

The washer insert 40 on the undersurface of valve 38 is of such size and shape as to firmly contact the bead 42 when the valve is moved to its closed position, so as to cut off the flow of fluid from inlet chamber 28 to the outlet chamber 30.

Cap member 20, comprising the upper closure for the valve body 12, has a hollow, upwardly extending neck portion 48 to support valve 38 in its axial movement and so that the surface 60 of valve 38 will be subjected to the pressure of the atmosphere. As previously pointed out, the upper cap member 20 is shaped so as to extend over the inlet chamber 28, and the internal diameter of throat member 48 is equal to the opening 44 in valve seat ring 36.

A coil compression spring 50 is confined between the upper surface 60 of valve 38 and the closure plug member 52 which is screw threaded in the outer end of the throat 48 of cap 20, so as to encircle the upstanding valve lift rod 54. Lift rod 54 has the cross piece 56 on its free end so that valve 38 may be manually lifted for test purposes. The compression of spring 50 may be varied by means of the member 52 so as to vary the force which must be overcome to open valve 38.

Valve 38 is provided with an axially slidable seal on its upper extension, preferably of the O-ring type, to prevent loss of fluid from the inlet chamber 28 to the atmosphere through the throat portion 48, as the valve is moved in response to temperature and pressure conditions of the system. Spring 50 normally maintains valve 38 in a closed position, so that waste of fluid through valve opening 44 does not normally occur.

As has been previously noted, the surface 60 of valve 38 communicates with the atmosphere by means of the clearance between the valve extension 54 and the plug 52. The top surface area 62 of the valve 38 is substantially equal to the bottom surface area 64 thereof outside the bead 42 exposed to the fluid pressure of the system, so that when the valve is in use the pressure of the fluid in the inlet chamber on the valve 38 is substantially balanced. However, the upper surface area 62 of valve 38 is exposed to system pressure slightly in excess of the undersurface area 64 in order that a small component of the system pressure will aid in the rapid seating of valve 38 after the latter has been unseated for temperature relief, as later described.

Valve 38 has a depending guide member 66 extending through valve opening 44 and secured to valve 38 in any suitable manner, such as by means of the threaded bolt 68, which is also utilized to maintain the composition washer undersurface 40 of the valve in position. The guide member 66 has the circumferential radial ribs 70 which are spaced substantially 90° apart in order to permit the fluid to pass from the inlet chamber 28 into the outlet chamber 30 when the valve is raised from its seat.

The thermal responsive element to raise the valve 38 includes a bellows or "Sylphon" 72 which is positioned in the outlet chamber 30, and which has an upwardly extending tubular boss 74 for contact with guide 66. The bellows 72, at its opposite or lower end, has a depending beveled shoulder 76 arranged to engage the top of the lower opening 34 in the inner partition 26. The depending metal tube 78 also constitutes a part of the thermal responsive element and is secured at its upper end in any suitable manner to the bellows 72 and communicates with the interior thereof. By means of fluid filled tube 78 heat is transferred from the inlet chamber 28 to the bellows 72 secured in the outlet chamber 30. Both tube 78 and bellows 72 are filled with a heat expansible liquid, and the lower end of tube 78 is closed in any suitable manner, such as by crimping (not shown), so as to confine the heat expansible liquid within the tube and bellows.

The portion of the bellows 72 extending through lower opening 34 is grooved as at 73 to receive a suitable packing, such as an O-ring or the like, 79 which prevents the passage of the fluid from inlet chamber 28 to outlet chamber 30 through the lower opening 34 in the partition 26. This construction provides a tight sliding seal upon axial movement of the tube 78 and bellows 72 within the opening 34.

The outlet opening 16 has internal threads and may be connected to a discharge pipe 75 or the like to withdraw the excess fluid delivered to the chamber 30 when valve 38 is thermostatically or pressure operated so as to permit fluid to pass into the outlet chamber.

In operation, the relief valve of the present invention may be screw threaded by means of the lower threaded projection 80 into a suitable tank or boiler 81 with which the valve is to be used. The temperature of the fluid, such as water in tank 81, will be such as to normally leave valve 38 in its closed position against its beaded seat 42, coil spring 50 tending to maintain the valve normally closed. The fluid pressure on the upper surface of the valve 38 is substantially balanced by the pressure being allowed to act on a substantially equivalent area on the underside of the valve 38, and, since the surface 60 of the valve 38 is in communication with the atmosphere, the system pressure on valve 38 is substantially balanced at this point.

When the temperature within inlet chamber 28 reaches a predetermined point, the heat is transmitted by means of the expansible fluid within tube 78 to bellows 72 which expand downwardly to a slight extent until the flange or seat portion 76 abuts the area around the lower opening 34. The bellows 72, as it expands, moves the guide member 66, connected to valve 38, whereby valve 38 is raised from its seat, permitting discharge of fluid to the outlet chamber 30.

When the pressure of the system becomes excessive, the tubular portion 78, including bellows 72, is moved upwardly against guide 66 by the pressure acting on the tubular portion 78 and surface area 71 of bellows 72 until valve 38 is unseated to effect relief from the excessive pressure.

In the modification shown in Figures 5 through 9 the valve structure is substantially similar to the form previously described. However, it has been modified in several respects in order to provide a valve whereby the pressure at which the valve will be opened can be varied.

In this form, valve housing 100 is provided, which is made up of two parts. The lower part 102 has the depending externally threaded portion 104 to be threaded into a boiler, water tank or the like. The upper or cap portion 106 is secured to lower portion 102 by means of threaded bolts 108. Lower inlet opening 110, outlet opening 112 and the upper cap atmospheric opening 114 are provided as previously described in connection with Figure 1. Internally the valve is divided into the inlet chamber 116 and outlet chamber 118 by means of the interior partition 120, which comprises the lower transverse section 121 and vertical section 122. Section 122 is spaced from the adjacent wall of the valve body section 102 to form the inlet passage 116 leading to the valve opening to be hereinafter described. Valve 124, having the upper extension 126 communicating with the atmosphere, is disposed in the inlet chamber 116. Valve 124 is provided with a recessed area 127 in its undersurface to receive the composition washer 129.

The upper valve extension 126 extends through the cap opening 114 and has the cross member 130 extending through its free end to provide a means for manual lifting of the valve 124 for test purposes. An axially slidable sealing means 132, preferably of the O-ring type, moves with valve extension 126 and contacts the inner walls of the opening 114 to prevent leakage of fluid from the inlet chamber to the atmosphere. Valve 124 is held in a normally seated or closed position by means of the coil spring 134 which encircles the valve extension 126 between the upper surface 105 of valve 124 and the inner transverse portion 136 of the valve cap 106.

The vertical portion 122 of the inner partition 120 terminates with its free end spaced from the inner walls of the valve body 100 to provide the threaded opening 138 to receive the valve seat ring 140. Valve seat ring 140 is provided with an outwardly extending flange 141 to limit excessive downward movement and is provided with circular upstanding bead 142 upon which the valve washer 129 seats.

Valve seat ring 140 is provided with an opening 144 through which the polygonal seat washer guide 146 extends. Guide member 146 is secured to valve 124 by means of the threaded bolt 147, and the guide 146 contacts the upstanding boss member 145 and acts as a link to lift valve 124 from its seat upon the expansion of the temperature responsive device to be hereinafter described.

Disposed within outlet chamber 118 is a temperature responsive element 148, of the bellows type, having the depending integral tubular extension 149, which extends through the opening 150 in the transverse portion 121 of the inner partition 120. Opening 150 is aligned with the valve opening 144 in the valve seat ring 140. Axially slidable seal 151, which may be of the O-ring type, is fitted within a recess 152 in the outer circumference of the tubular extension 149 to provide a seal to prevent leakage of fluid from the inlet chamber 116 to the outlet chamber 118 through the lower opening.

Bellows 148 is provided with a beveled portion 153 on its undersurface which seats against a complementary surface surrounding lower opening 150 in the partition 121.

At this point the construction of this modification varies somewhat from the form of valve shown in Figures 1 through 4, in that tubular extension 149 is provided with an externally threaded portion 154 adjacent its lower terminus to receive the adjustable flange 156. The lower threaded portion 104 of valve body 100 is provided with the integral guide member 158 of slightly less diameter than the portion 104 through which the tubular thermal extension 149 extends. Coil spring 160 is supported between the guide 158 and flange 156 which serves to hold the depending tubular portion 149 in a down position until the pressure within the system reaches a point sufficient to overcome spring 160 to thereby raise tubular member 149 and its associated bellows 148.

In operation, this modified valve will be secured to a heating system by means of threaded portion 104 as previously described. Bellows 148 and tubular extension 149, which is closed at its lower end by means of crimping, will be filled with heat expansible fluid. The system fluid will flow in the inlet chamber 116 in the direction of the arrows so as to completely surround tubular extension 149 filled with the heat expansible fluid.

It should be pointed out that the valve 124 is in the inlet chamber 116 and consequently will be subject to the pressure of the system. In order to prevent excessive embedding of the valve washer 129 on its beaded seat 142, the valve construction according to the present invention provides a substantially balanced pressure on valve 124 so as to obviate the possibility of damage to the valve washer. It will be observed that the upper surface area 105 of valve 124 is substantially equal to the undersurface area 107 exposed to the pressure of the system. In order to provide for a rapid re-seating of valve 124 the upper surface area 105 of valve 124 is exposed to fluid pressure slightly in excess of the undersurface area 107 exposed, so that a slight component of the system pressure will aid in the seating of valve 124.

Upon the temperature of the fluid in the inlet chamber 116 reaching a predetermined point, the heat from the inlet chamber 116 will be transmitted to the bellows 148 by means of the fluid in tubular extension 149. This causes the expansion of bellows 148 against guide 146 which raises valve 124 from its seat to allow discharge of fluid through the opening 144, around guide 146, to the outlet chamber 118 where a discharge pipe 119 removes the wasted fluid from the system.

The point at which pressure relief will occur in this modification depends upon the compression of spring 160 which may be varied by means of the adjustable flange 156. When the pressure reaches the point set for relief, tubular extension 149 and the bellows 148 are bodily moved upwardly so as to contact the guide 146 and unseat valve 124 to permit pressure relief of the fluid through valve opening 144 around guide 146 and out waste port 119. It will be observed that the pressure of the system must overcome the tension of spring 160 as well as the force of spring 134 which tends to keep valve 124 in a normally seated position.

In both these modifications the valve is subject only to the force of the spring which keeps it in its normally seated position, when in stock as well as when in use under pressure conditions. It should be noted that in both forms of the invention there is provided an automatic or re-seating quick actuating temperature and pressure relief valve in which replacement of all the working parts can be had without removing the valve from the fluid heating systems with which it is connected, and which is simple, efficient and accurate in operation.

Furthermore, the sensitive bellows are positioned within the outlet chamber so as not to be subjected to contact with foreign particles or corrosion which would injure the moving parts and which might penetrate the thin bellows and cause the temperature element or thermostat to become inoperative. Additionally, both modifications are so constructed as to maintain the closure pressure exerted on the valve at a point just sufficient to effect a sealing contact of the valve with its seat. Also, the position of the bellows in the outlet chamber acts as a deflector for directing the excess heated fluid from the outlet chamber.

It will be understood that the forms of the invention shown and described are merely illustrative of preferred embodiments and that such changes may be made to the valve assembly as come within the scope of the attached claims.

We claim:

1. A relief valve comprising: a housing provided with vertically-spaced upper and lower transverse partitions connected at one side by a vertical wall spaced from the outer wall of said housing to form a passage therebetween, said partitions separating the interior of said housing into an inlet chamber and an outlet chamber and having a pair of aligned openings therethrough; an upwardly-facing valve seat about said opening in said upper partition; a reciprocating valve in said inlet chamber engageable with said seat; yieldable means for normally holding said valve against said seat; an extension on said valve slidably and sealingly engaged in an opening in an outer wall of said housing for exposure of the outer end of said extension to atmospheric pressure, said extension being of substantially the same area in cross section as that encompassed by said valve seat; a thermally-responsive element including a bellows positioned in said outlet chamber in alignment with said partition openings for lifting engagement with said valve and a depending tubular portion sealingly and slidably extending through said opening in said lower partition into said inlet chamber; and stop means for preventing downward movement of said element through said last-mentioned opening, whereby predetermined thermal expansion of said element will lift said valve from its seat, and bodily-upward movement of said element by a predetermined pressure in said inlet chamber will lift said valve from its seat.

2. The structure defined in claim 1 wherein the tubular portion of the thermal element has packing movable therewith and engaging the wall of the opening in the lower partition.

3. The structure defined in claim 1 wherein the valve extension has packing movable therewith and engaging the wall of the opening in the outer wall of the housing.

4. The structure defined in claim 1 including yieldable means engaged with said thermal element for bodily urging the same away from the valve.

5. A relief valve comprising: a casing having a hollow partition wall therein dividing the casing interior into separate inlet and outlet chambers, said wall having aligned top and bottom openings therein; an upwardly-facing valve seat encompassing said top opening; a reciprocating valve in said inlet chamber engageable with said seat; yieldable means for normally maintaining said valve seated on said seat; an extension on said valve slidably and sealingly extending through the top of said casing for exposure to atmospheric pressure, the pressure affected area of said extension being substantially equal to that encompassed by said seat; thermally-responsive means including an expansible element positioned in said outlet chamber in alignment with said openings for lifting engagement with said valve and a depending portion slidably and sealingly extending through said bottom opening into said inlet chamber for transmitting heat from the fluid therein to said element; and stop means for preventing downward movement of said thermally-responsive means through said bottom opening, said thermally-responsive means being bodily movable upward to unseat said valve in response to a predetermined pressure of fluid in said inlet chamber.

6. A combination temperature and pressure relief valve comprising a housing, said housing having an inlet opening, an outlet opening and an opening communicating with the atmosphere, a hollow partition in said housing dividing the interior thereof into inlet and outlet chambers, aligned upper and lower openings in said partition, an upwardly extending valve seat disposed within said upper opening, a valve member in said inlet chamber having means for normally maintaining seating contact with said valve seat, an axially slidable upstanding extension on said valve disposed within said atmospheric opening and exposed to the atmosphere, whereby the top surface area of said valve exposed to the fluid pressure of said inlet chamber is restricted, axially slidable sealing means movable with said valve extension to prevent loss of fluid to the atmosphere, means disposed on the free end of said valve extension whereby manual test lifting of said valve from its seat is possible, a thermal responsive element disposed within said outlet chamber with a depending tubular portion extending through said lower opening in said partition into said inlet chamber, means linking said thermal element with said valve whereby upon expansion of said thermal element caused by the heated fluid in said inlet chamber said valve will be lifted from its seat, said thermal element and depending tubular portion being capable of axial bodily movement in response to the pressure in said inlet chamber to unseat said valve upon the pressure reaching a predetermined point, and sealing means movable with said tubular portion to prevent leakage of fluid from said inlet to said outlet chamber through said lower partition opening.

7. A relief valve as claimed in claim 6 having means disposed adjacent the lower free end of said tubular extension of said thermal element to prevent axial movement of said member until the fluid pressure reaches a predetermined value, and means for predetermining the pressure at which axial movement of said member takes place.

8. A relief valve as claimed in claim 6 having means to prevent substantial downward axial movement of said depending tubular portion upon expansion of said thermal responsive element under condition of elevated temperature of the fluid in said inlet chamber.

References Cited in the file of this patent
UNITED STATES PATENTS

| | | |
|---|---|---|
| 2,047,722 | Work | July 14, 1936 |
| 2,223,115 | McDermott | Nov. 26, 1940 |
| 2,335,778 | Martin-Hurst | Nov. 30, 1943 |
| 2,389,437 | Kmiecik | Nov. 20, 1945 |
| 2,420,206 | Smith | May 6, 1947 |
| 2,461,982 | Horne | Feb. 15, 1949 |
| 2,497,201 | Banner | Feb. 14, 1950 |
| 2,570,432 | Dillon | Oct. 9, 1951 |
| 2,642,229 | Mueller et al. | June 16, 1953 |